Nye & Haviland,
Hollow Auger.

Nº 28,400.   Patented May 22, 1860.

Witnesses,
S. J. Allis
James Jones

Inventors:
G. M. Nye
A. P. Haviland
By J. Fraser
their Attorney

UNITED STATES PATENT OFFICE.

G. M. NYE AND A. T. HAVILAND, OF ELMIRA, NEW YORK.

HOLLOW AUGER.

Specification of Letters Patent No. 28,400, dated May 22, 1860.

*To all whom it may concern:*

Be it known that we, G. M. NYE and A. T. HAVILAND, both of Elmira, in the county of Chemung and State of New York, have invented certain new and useful Improvements in Machine-Augers for Boring Wood Tubing; and we do hereby declare that the following is a full and exact description thereof, reference being had to the accompanying drawings, making part of this specification, in which—

Figure 3:
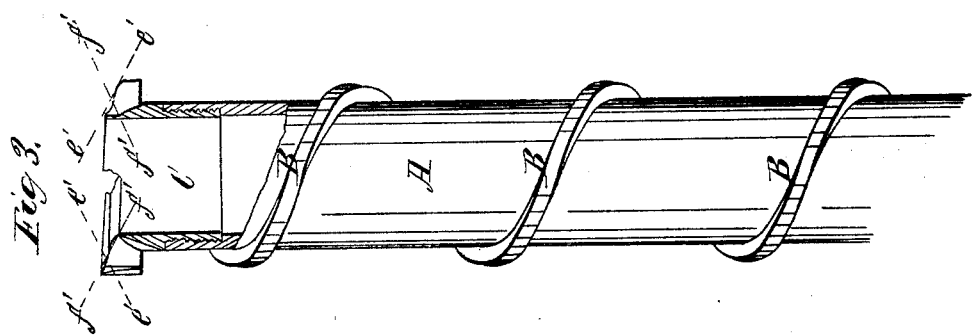
Figure 2:
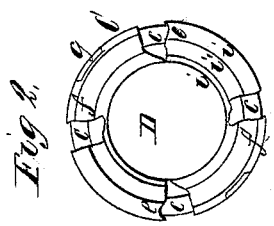
Figure 1:
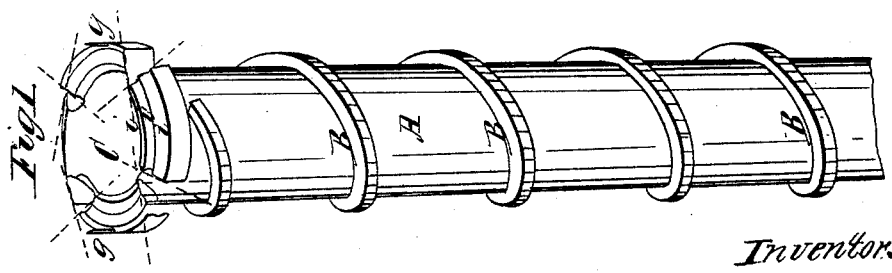

Figure 1 is a perspective view of the cutting head, and a portion of the stock thereof. Fig. 2, is a direct end view, or elevation, of the cutting head. Fig. 3, is an elevation with the head shown in section.

Like letters designate corresponding parts in all of the figures.

Our improvement relates to the head or cutting portion of those boring machines which are tubular, and designed to remove an annular portion of the wood and leave a rod or "core" remaining. They are chiefly employed for boring long distances, such as water pipes, etc., and being necessarily driven at high rates of speed, are liable to choke and clog from the difficulty of removing the chips as fast as required, and also to heat and otherwise injure the implement, thereby necessitating a slow rate of boring. Our improvements are designed to remedy these difficulties and by facilitating the removal of chips enable the work to be accomplished much more rapidly, and in a better manner.

As shown in the drawings A is the tubular stock wound with a spiral worm, B, for removing the chips.

C is the cutting head, which is connected with the stock by an interior screw. The size of the opening D, Fig. 2, corresponds with that of the core left, and the diameter of the annular, or cutting portion, with that of the bore. The cutting is performed by four cutting lips or edges $e$ $e$ and $f$ $f$, the annulus being about equally divided into four parts by the intervening throats $c$ $c$. The cutters are constructed alike except that they have alternately inclinations opposed to each other; $f$ $f$ inclining in toward the center, and $e$ $e$ inclining outwardly from the center to the periphery. These opposing lines of inclination cross each other as shown by the dotted lines in Figs. 3. ($f'$ $f'$ and $e'$ $e'$.) The result obtained by this arrangement is that the cutters alternately cut the inner and outer surface of the bore, one following directly after the other, thus dividing the chips, which are taken out of the size of the bore into two parts, rendering them much smaller, and consequently more easily removed. Each cutter has its surface divided into two planes, $i$ $i$, with a groove between $i'$, the effect of which is that the chips being cut quite thin by the described arrangement of cutter are divided again at the angles formed by the grooves and planes by splitting apart, which they readily do from being cut transversely of the grain, and are thus reduced to minute particles which easily pass the throats $c$ and the small space around the stock. This so facilitates their removal by the motion of the worm as to effectually prevent clogging, and enable the boring to be performed in a much more rapid manner than by the ordinary means. The cutting edges also are not straight, but somewhat serrated to aid in producing this effect.

Small spurs, $g$ $g$, are added to the periphery of the cutters to aid in separating the chips, and give a smoother surface to the bore; and similar ones may be placed on the interior of the periphery if it is desired to trim the core smoothly at the same time.

It will be seen that two cutters having the reversed inclination described would effect the same object, except that the boring would be less rapid and the chips not so fine; and to increase these results a greater number of cutters may be added with like effect. But we consider that four cutters is the most convenient number for ordinary purposes.

It is obvious that, by securing the minute subdivision of the chips both by dividing the ordinary chips in the manner shown, and by the disintegration of the fibers themselves, that they will more readily pass through the throats $c$ without clogging and that, as a consequence, the machine may be driven at a much higher speed, greatly increasing its capacity, while the work is accomplished in a better manner, the fibers not being torn so much, and left in a rough state.

What we claim as our invention and desire to secure by Letters Patent is—

1. The combination and arrangement of the cutting lips or edges *e f*, having their inclinations alternately reversed, so that one cuts in a direction which crosses that of the preceding one; said cutters being formed with a series of planes and grooves *i i* upon their faces, substantially in the manner and for the purposes specified.

2. The vertical spurs *g, g*, in combination with the alternate cutters.

G. M. NYE.
A. T. HAVILAND.

Witnesses:
N. CAULDWELL,
S. B. DENTON.